Patented May 5, 1953

2,637,724

UNITED STATES PATENT OFFICE 2,637,724

METHYLOLSTREPTOMYCIN

Charles I. Jarowski, Flushing, and Francis X. Murphy, Elmhurst, N. Y., assignors to Chas. Pfizer & Co., Inc., New York, N. Y., a corporation of Delaware No Drawing. Application June 28, 1949, Serial No. 101,927

5 Claims. (Cl. 260—210)

This invention relates to certain novel therapeutically useful derivatives of streptomycin and to methods for their preparation. More particularly, it relates to reaction products of formaldehyde with streptomycin, dihydrostreptomycin and related biologically active derivatives of streptomycin.

Streptomycin is an antibiotic of known composition which can be obtained from cultures of certain strains of the micro-organism *Streptomyces griseus*. Methods for the production and purification of streptomycin have been extensively studied and are well known.

Although streptomycin is an effective antibiotic in the treatment of a number of infectious diseases, it has certain definite drawbacks that tend to limit its use. The most important of these is its neurotoxicity which appears upon prolonged use, as when employed in tuberculosis therapy.

In the search for derivatives of streptomycin having improved properties, a number of chemical modifications of streptomycin have been prepared. One of these derivatives is dihydrostreptomycin which is produced by hydrogenating streptomycin. This compound has biological activity comparable to streptomycin itself, and although it also produces neurotoxic effects, these are manifested only after a longer period of treatment than is the case with streptomycin. Other biologically active derivatives of streptomycin which have been prepared are the streptomycylamines including the N-alkyl-streptomyclamines.

Although improvements over the neurotoxicity of streptomycin have been obtained in dihydrostreptomycin, nevertheless, the value of compounds having a comparable antibiotic action to streptomycin would be considerably enhanced if the previously mentioned undesirable feature could be still further diminished or entirely eliminated.

An object of this invention is to provide new biologically active derivatives of streptomycin having improved neurotoxicity characteristics. A further object is to prepare reaction products of formaldehyde with streptomycin and its biologically active derivatives. Further objects will appear hereinafter.

These objects are accomplished and the foregoing and other disadvantages are overcome by the following invention which comprises reacting formaldehyde with streptomycin or one of its therapeutically active derivatives having free hydrogen-bearing amino groups and isolating the formaldehyde reaction products so formed. By this reaction formaldehyde combines with the streptomycin or streptomycin derivative to form a methylolstreptomycin. For example, formaldehyde and streptomycin give methylolstreptomycin, formaldehyde and dihydrostreptomycin give methyloldihydrostreptomycin and formaldehyde and streptomycylamines give methylolstreptomycylamines.

The formaldehyde reaction products of streptomycin and its derivatives having free hydrogen-bearing amino groups, that is, the methylolstreptomycins, are white, water-soluble solid compounds which have excellent antibiotic properties, comparable to the parent compounds, but at the same time they have a surprisingly improved degree of neurotoxicity and an improved acute mouse toxicity. The improvement in biological properties of the methylolstreptomycin derivatives over the parent compounds makes them of considerably greater usefulness in medicine than the parent compounds themselves.

In one method of preparing the methylolstreptomycins, for example methylolstreptomycin, a solution of a streptomycin salt in methanol is adjusted to a neutral or an alkaline pH and, after addition of aqueous formaldehyde, preferably 40% aqueous formaldehyde, the mixture is allowed to stand in a refrigerator at about 15° C. for a period of time. The reaction product may then be recovered by precipitation with acetone and vacuum drying.

The invention is further illustrated by the following examples:

EXAMPLE 1

*Methylolstreptomycin*

Four hundred grams of the calcium chloride double salt of streptomycin was dissolved in three liters of methanol and the pH was adjusted to 9.5 with 10% potassium hydroxide solution. After adding 250 ml. of 40% aqueous formaldehyde, the mixture was allowed to stand at refrigerator temperature (approximately 15° C.) for one hour. The solution was then filtered into 15 liters of acetone. The precipitate, identified as methylolstreptomycin, was filtered on a large porcelain funnel and washed with acetone. The material dried overnight in vacuum at room temperature weighed 322 grams. The product was a white powder very soluble in water. When this material was tested for its in vitro activity against *E. coli*, it was found to have an activity per milligram equivalent to 688 micrograms of streptomycin, and against *B. subtilis*, it had an activity per milligram equivalent to 693 micrograms of streptomycin. This product had an acute mouse toxicity of 3000 micrograms ($LD_0$) per twenty gram mouse, whereas the toxicity of streptomycin is 1500–1800 micrograms per 20 gram mouse. When 100,000 units per kilogram body weight of this material was administered to one cat for 32 days and to two others for 39 days, no neurotoxicity was observed. Streptomycin in this dosage generally produces neurotoxicity in 7 to 10 days. The derivative has been shown to be as active as streptomycin against eight strains of *M. tuberculosis*.

Methylolstreptomycin was shown to be free of uncombined formaldehyde by testing a solution with Schiff's reagent. The combined formaldehyde was found to be 3.1%, when assayed by the quantitative procedure of MacFayden. (MacFayden, Journal of Biological Chemistry, vol. 158, p. 107 (1945).) Using the maltol assay for streptomycin, (Boxer, et al., Journal of Biological Chemistry, vol. 169, p. 153 (1947).) The value for the product obtained above is 650 mcg./mg. (as streptomycin), and from this it may be calculated that there should be 3.2% of bound formaldehyde present in this material, when the substances combine in equimolecular ratio.

EXAMPLE 2

*Methyloldihydrostreptomycin*

Dihydrostreptomycin sulfate (14.6 g.) was dissolved in 25 ml. of distilled water and 15 ml. of 40% aqueous formaldehyde was added. The solution was stored at refrigerator temperature (about 15° C.) overnight and was then poured into several volumes of acetone. The precipitated white solid, identified as methyloldihydrostreptomycin, was filtered and dried under vacuum at 55° C. for 24 hrs. The compound was analyzed by the method used previously (MacFayden, Journal of Biological Chemistry, 158, 107 (1945)) and found to contain somewhat less than one mole of bound formaldehyde per mole of dihydrostreptomycin.

EXAMPLE 3

*Methylolstreptomycylamine*

Streptomycylamine (2.0 g.) was dissolved in 5.0 ml. of water and 2.0 ml. of 40% aqueous formaldehyde was added. The solution was adjusted to pH 8.0 with dilute alkali, and it was allowed to stand at room temperature (approximately 20° C.) overnight. The solution was frozen and dried from the frozen state under vacuum. The resulting product was triturated with methanol, filtered, dissolved in twenty ml. of methanol containing just sufficient water and was then precipitated by adding to acetone. The product, identified as methylolstreptomycylamine contained 2.2% of bound formaldehyde. As shown by Schiff's reagent no free formaldehyde was present in the product.

Similar results are obtained when an N-substituted streptomycylamine, for example N-dodecyl-streptomycylamine, mannosidostreptomycin and dihydromannosidostreptomycin are substituted for the streptomycin compounds of the above examples.

In preparing a methylolstreptomycin, the pH of the reaction mixture may be adjusted to a pH of between about 7.0 and 9.5. The reaction will occur at lower or higher pHs, but below about 7.0 the reaction is appreciably slower, and above 9.5 a considerable amount of decomposition of the antibiotic occurs. Best results are obtained when the pH of the reaction is adjusted to within the range of 8.0 to 9.5.

The formaldehyde content of the reaction mixture may be varied from about 0.2% to 12% by weight. Higher formaldehyde concentrations make purification of the product difficult, and lower concentrations greatly increase the time necessary to obtain a reasonable yield of the product. Formaldehyde concentrations in the reaction mixture within the range of about 0.5 to about 2% are preferred.

The reaction may be carried out over a period of from 0.25 to 24 hours or longer. Usually from 0.5 to 2 hours is sufficient to produce the desired reaction.

The reaction proceeds satisfactorily within a temperature range of from 10 to 40° C., although best results are obtained between 15 to 30° C. Temperatures above 40° C. are apt to cause some decomposition of the antibiotic, particularly when employed with the higher pH ranges.

Paraformaldehyde can be used in place of formaldehyde in aqueous solution, but the rate of reaction is appreciably slower due to the slow depolymerization of the paraformaldehyde.

Other solvents, for example ethanol in admixture with water, can be used. Other purification procedures may be employed, for example solvents other than acetone in which the product is insoluble, may be used for precipitation. The product can be isolated by removing the organic solvent, and then drying the aqueous solution under vacuum from the frozen state.

Ordinarily one molecule of formaldehyde reacts with one molecule of streptomycin or dihydrostreptomycin. But in these cases and in those of streptomycylamine of the N-alkyl-streptomycylamines more than one molecule of formaldehyde may be combined. The investigation of the structure of streptomycin indicates that the first molecule of formaldehyde reacts at the nitrogen atom of N-methylglucosamine moiety of streptomycin.

This invention provides a new series of streptomycin derivaties having antibiotic properties which are comparable with that of streptomycin, but which have surprisingly improved neurotoxicity.

As many apparently widely different embodiments of this invention may be made without departing from the spirit and scope hereof, it is to be understood that this invention is not limited to the specific embodiments hereof, except as defined in the appended claims.

We claim:

1. A methylol-containing, water-soluble, biologically active condensation product of formaldehyde with a compound selected from the group consisting of streptomycin, dihydrostreptomycin and streptomycylamines.

2. A methylol-containing, water-soluble, biologically active condensation product of formaldehyde with streptomycin.

3. A methylol-containing, water-soluble, biologically active condensation product of formaldehyde with dihydrostreptomycin.

4. A methylol-containing, water-soluble, biologically active condensation product of formaldehyde with a streptomycylamine.

5. A process which comprises condensing formaldehyde with a material selected from the group consisting of streptomycin, dihydrostreptomycin and streptomycylamines, and recovering the methylol compound formed.

CHARLES I. JAROWSKI.
FRANCIS X. MURPHY.

References Cited in the file of this patent

UNITED STATES PATENTS

| Number | Name | Date |
|---|---|---|
| 2,438,209 | Fraenkel-Conrat et al. | Mar. 23, 1948 |
| 2,540,243 | Brink et al. | Feb. 6, 1951 |
| 2,557,560 | Peck | June 19, 1951 |